United States Patent
Sugawara et al.

(10) Patent No.: US 10,578,060 B2
(45) Date of Patent: Mar. 3, 2020

(54) VALVE DEVICE

(71) Applicant: DENSO CORPORATION, Kariya, Aichi-pref. (JP)

(72) Inventors: Takehiro Sugawara, Kariya (JP); Takahiro Kozu, Kariya (JP); Tomio Oshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/302,296

(22) PCT Filed: Apr. 12, 2017

(86) PCT No.: PCT/JP2017/014903
§ 371 (c)(1),
(2) Date: Nov. 16, 2018

(87) PCT Pub. No.: WO2017/203872
PCT Pub. Date: Nov. 30, 2017

(65) Prior Publication Data
US 2019/0277226 A1    Sep. 12, 2019

(30) Foreign Application Priority Data

May 24, 2016 (JP) ................................. 2016-103042

(51) Int. Cl.
*F02M 26/70* (2016.01)
*F02D 9/10* (2006.01)
(Continued)

(52) U.S. Cl.
CPC ........... *F02M 26/70* (2016.02); *F02D 9/1045* (2013.01); *F02M 26/72* (2016.02); *F16J 15/06* (2013.01);
(Continued)

(58) Field of Classification Search
CPC ........ F02M 26/70; F02M 26/53; F02M 26/72; F16J 15/06; F16J 15/10; F16J 15/106; F16J 15/102; F16J 15/062; F16K 31/04; F16K 27/12; F16K 27/00; F16K 1/465; F02D 9/1045; F02D 2041/1472
See application file for complete search history.

(56) References Cited

U.S. PATENT DOCUMENTS

| 3,913,927 A | 10/1975 | Gordon |
| 5,390,939 A | 2/1995 | Terauchi et al. |
| 2006/0169099 A1 | 8/2006 | Diez |

FOREIGN PATENT DOCUMENTS

| DE | 102 45 803 | 4/2004 |
| JP | 50-35259 | 10/1975 |

(Continued)

*Primary Examiner* — Xiao En Mo
(74) *Attorney, Agent, or Firm* — Nixon & Vanderhye P.C.

(57) ABSTRACT

A preset compression ratio of a gasket is set to be larger at a center segment than at fixation segments. In order to set the preset compression ratio in the above-described manner, a depth of a center-segment-side bottom surface of a cover is set to be smaller than a depth of each fixation-segment-side bottom surface at the cover. In this way, even when a phenomenon, which causes a reduction of the compression ratio of the center segment of the gasket relative to the compression ratio of the fixation segments, occurs, it is possible to limit the reduction of the compression ratio of the center segment to a value that is lower than the compression ratio of the fixation segment.

7 Claims, 13 Drawing Sheets

(51) Int. Cl.
*F16K 1/46* (2006.01)
*F16J 15/06* (2006.01)
*F16K 27/00* (2006.01)
*F16K 27/12* (2006.01)
*F16J 15/10* (2006.01)
*F02M 26/72* (2016.01)
*F16K 31/04* (2006.01)
*F02D 41/14* (2006.01)

(52) U.S. Cl.
CPC .............. *F16J 15/062* (2013.01); *F16J 15/10* (2013.01); *F16J 15/102* (2013.01); *F16J 15/106* (2013.01); *F16K 1/465* (2013.01); *F16K 27/00* (2013.01); *F16K 27/12* (2013.01); *F16K 31/04* (2013.01); *F02D 2041/1472* (2013.01)

(56) References Cited

FOREIGN PATENT DOCUMENTS

| | | |
|---|---|---|
| JP | 51-25109 | 6/1976 |
| JP | 53-104861 | 8/1978 |
| JP | 58-28158 | 2/1983 |
| JP | 2015-64097 | 4/2015 |

ns
VALVE DEVICE

CROSS REFERENCE TO RELATED APPLICATION

This application is the U.S. national phase of International Application No. PCT/JP2017/014903 filed Apr. 12, 2017 which designated the U.S. and claims priority to Japanese Patent Application No. 2016-103042 filed on May 24, 2016, the entire contents of each of which are incorporated by reference.

TECHNICAL FIELD

The present disclosure relates to a valve device that uses a gasket, which is shaped into a ring form, to limit intrusion of water into an inside of a receiving chamber that receives a plurality of gears.

BACKGROUND ART

Previously, there is proposed a valve device that adjusts a flow rate of EGR gas that is a portion of exhaust gas exhausted from an internal combustion engine (hereinafter referred to as an engine) (see, for example, the patent document 1).

In the valve device, a body, which receives a valve, has a receiving chamber that receives a plurality of gears, which transmit a rotational output of a motor to the valve. An opening of the receiving chamber is closed with a cover.

The cover is fixed to an end surface of a body at a plurality of fixation points in a state where a gasket, which is shaped into a ring form, is clamped between the end surface of the body and an end surface of the cover. A gasket groove, which receives the gasket, is formed at the end surface of the cover and/or the end surface of the body.

The gasket is a seal material that is made of synthetic rubber and hermetically seals between the end surface of the body and a bottom surface of the gasket groove. The gasket includes fixation segments that are clamped between the body and the cover and are respectively placed adjacent to the fixing points between the body and the cover.

The valve device limits intrusion of the water from an outside into the receiving chamber because of the presence of the gasket.

However, in a case where a distance between adjacent two of the fixing points is relatively long, specifically at a location, which is far from the fixation segments of the gasket, particularly a center segment between the fixation segments, the cover may be resiliently deformed by a resilient repulsive force that is generated through compression of the gasket in some cases. This may result in a reduction in the compression ratio at the center segment of the gasket.

Furthermore, the cover may be resiliently deformed by a pressure change in the receiving chamber under the high temperature environment. This may result in a reduction in the compression ratio at the center segment of the gasket.

Thus, at the center segment of the gasket, the hermetic sealing performance will be likely reduced in comparison to the fixation segments of the gasket. Thereby, the waterproof performance against the externally applied water (e.g., high-pressure washing water, rainwater) may be disadvantageously deteriorated.

CITATION LIST

Patent Literature

PATENT LITERATURE 1: JP2015-064097A

SUMMARY OF INVENTION

The present disclosure is made in view of the above disadvantage, and it is an objective of the present disclosure to ensure the waterproofness against the externally applied water even when the compression ratio at the center segment of the gasket is reduced.

According to an aspect of the present disclosure, a plurality of points, at which a body and a cover are fixed together, is defined as a plurality of fixing points. A gasket is an elastomer that is compressed at least in a stacking direction, in which the body and the cover are stacked. The gasket includes: a plurality of fixation segments, each of which is placed in an immediate vicinity of a corresponding one of the plurality of fixing points; and a center segment that is placed between corresponding two of the plurality of fixation segments.

A compression ratio of the gasket in the stacking direction is larger at the center segment than at the plurality of fixation segments.

In this way, even when a phenomenon, which causes a reduction of the compression ratio of the center segment of the gasket, occurs, it is possible to limit the reduction of the compression ratio of the center segment to a value that is lower than the compression ratio, which can maintain the waterproofness of, for example, the receiving chamber.

Therefore, even when the compression ratio of the center segment of the gasket is reduced, it is possible to ensure the waterproofness against the externally applied water with the resilient repulsive force exerted at the time of compressing the gasket upon clamping of the gasket between the body and the cover. Thus, the intrusion of the water from the outside to the inside of the receiving chamber can be limited.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Figure 1:
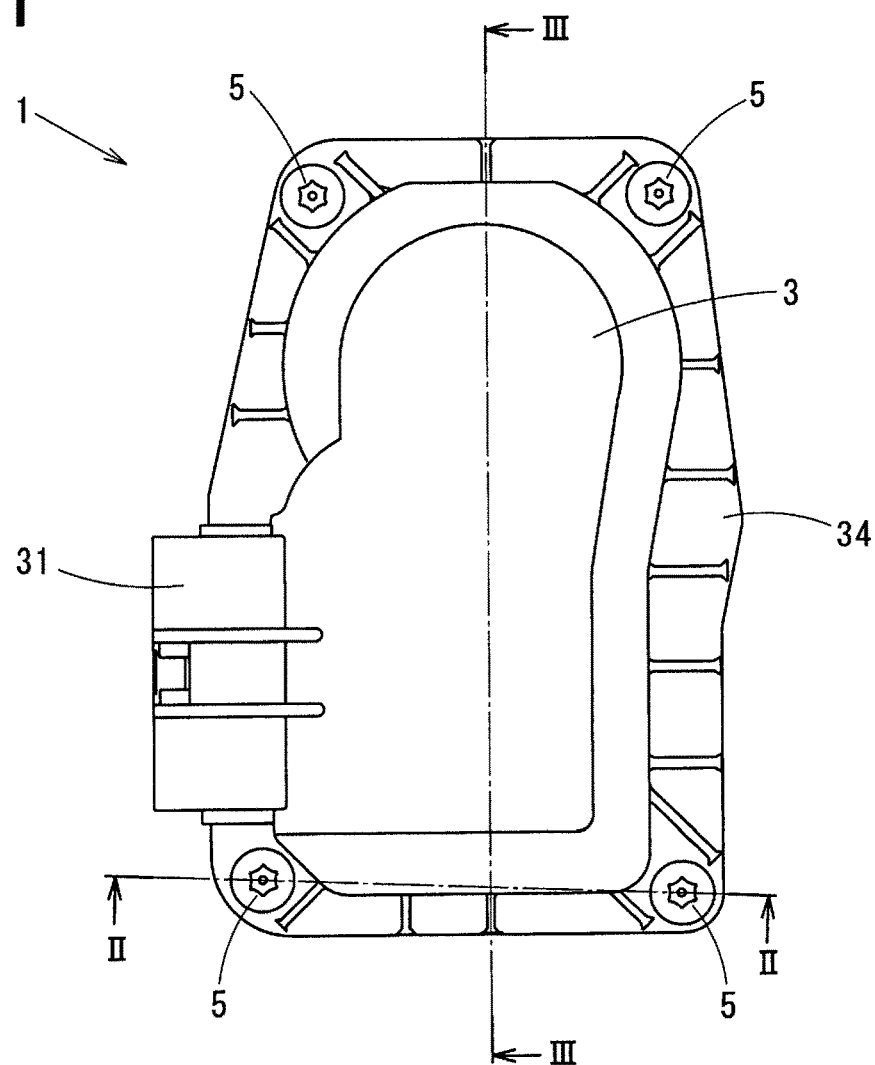
FIG. 1 is a plan view showing a valve device (first embodiment).

Embodiments of the present disclosure will be described with reference to the drawings.

Construction of First Embodiment

FIGS. 1 to 7 show a first embodiment of the present disclosure.

A valve device 1 of the present embodiment includes a body 2, a cover 3, a gasket 4, screws 5, a valve 6, a shaft 7, a spring 8, a motor 9, gears 11-13 and a sensor 14.

The body 2 receives the valve 6. The body 2 includes an EGR flow passage 21, a motor receiving chamber 22 and a gear receiving chamber 23.

The EGR flow passage 21 communicates between an exhaust passage and an intake passage of the engine and conducts EGR gas. A portion of the EGR flow passage 21 is formed in an inside of a nozzle 24, which is shaped into a cylindrical tubular form and is press fitted into the body 2.

The motor receiving chamber 22 is formed at a location that is different form a location of the EGR flow passage 21, and the motor receiving chamber 22 receives the motor 9. The motor receiving chamber 22 is communicated with the gear receiving chamber 23.

The gear receiving chamber 23 receives the gears 11-13.

The body 2 has a plurality of female-threaded holes 25, in which a plurality of screws 5 is respectively threadably engaged. The cover 3, which closes an opening of the gear receiving chamber 23, is installed to the body 2. The gear receiving chamber 23 is a space that is formed between the cover 3 and the body 2 when the cover 3 closes the opening of the gear receiving chamber 23. The gear receiving chamber 23 is formed to be isolated from an outside space. A first opposing surface 26, which is shaped into a ring form, is formed along a peripheral edge of the opening of the body 2.

Details of the body 2 will be described later.

The cover 3 holds the sensor 14 and is stacked to the body 2. An external connector 31, which is configured to connect the motor 9 and the sensor 14 to an external circuit, is formed at the cover 3. A plurality of insertion holes 32 is formed at the cover 3, and shafts of the screws 5 are respectively inserted through the insertion holes 32. A metal collar 33, which is configured to receive the shaft of the corresponding screw 5, is fitted into an inside of each insertion hole 32 for reinforcing purpose.

The cover 3 includes a flange 34 that projects toward an outside. The flange 34 has a second opposing surface 35, which is shaped into a ring form and is opposed to the first opposing surface 26 of the body 2 while a predetermined size of a gap is interposed between the first opposing surface 26 and the second opposing surface 35. The cover 3 includes a recess 36 to form the gear receiving chamber 23 between the cover 3 and the body 2.

Details of the cover 3 will be described later.

The gasket 4 is clamped between the body 2 and the cover 3 to seal the gap formed between the first opposing surface 26 and the second opposing surface 35.

The gasket 4 includes a plurality of fixation segments 42 and a plurality of center segments 43.

The gasket 4 is compressed at a predetermined compression ratio in a stacking direction of the body 2 and the cover 3, in which the body 2 and the cover 3 are stacked one after the other. The stacking direction is the same direction as the compressing direction of the gasket 4. Therefore, the compression ratio of the gasket 4 in the stacking direction may be also referred to as the compression ratio of the gasket 4 in the compressing direction. Furthermore, a thickness of the gasket 4 measured in the stacking direction may be also referred to as a thickness of the gasket 4 measured in the compressing direction. Here, it is assumed that the thickness of the gasket 4, which is measured in the stacking direction in a free state of the gasket 4 before the compression of the gasket 4, is indicated by Ta, and the thickness of the gasket 4, which is measured in the stacking direction in a compressed state of the gasket 4, is indicated by Tb. In such a case, the compression ratio of the gasket 4 is obtained with the following equation. A difference between the thickness Ta of the gasket 4 before the compression and the thickness Tb of the gasket 4 after the compression is a reduced thickness of the gasket 4, which is reduced by the compression.

$$\text{Compression ratio (\%)} = ((Ta-Tb)/Ta) \times 100$$

Details of the gasket 4 will be described later.

The valve 6 includes the shaft 7 that extends in an axial direction of the valve 6. The valve 6 is configured to reciprocate in a rotational direction about a rotational axis of the valve 6 (hereinafter, this reciprocating movement may also be referred to as rotation).

The valve 6 is configured to open and close the EGR flow passage 21. A seal ring groove 47 is formed at an outer periphery of the valve 6. A seal ring 48, which seals a gap between an inner peripheral surface of the nozzle 24 and the valve 6 at the closing time of the valve 6, is fitted into the seal ring groove 47.

The shaft 7 is connected to the valve 6 to rotate integrally with the valve 6. The shaft 7 is supported rotatably relative to the body 2 through, for example, a bearing 49.

An electric actuator, which drives the valve 6 and the shaft 7 to rotate the same, has a known structure. One example of the electric actuator includes the spring 8, the motor 9, the gears 11-13 and the sensor 14.

The spring 8 is installed between the body 2 and the gear 13. The spring 8 urges the valve 6, the shaft 7 and the gear 13 in a closing side of the valve 6 (known as a valve closing direction).

The motor 9 is configured to convert an electric power to a rotational torque and is received in the motor receiving chamber 22 of the body 2.

The gears 11-13 form a speed reducing mechanism that reduces a rotational speed of the output of the motor 9 to increase a drive force of the shaft. These gears 11-13 are received in the gear receiving chamber 23 of the body 2. Furthermore, the gears 11-13 form a drive force transmission mechanism that transmits the rotational force of the motor 9 to the valve 6.

The gear 11 is a pinion gear that is rotated integrally with an output shaft of the motor 9 and transmits the rotational output of the motor 9 to the gear 12.

The gear 12 is an intermediate gear that transmits the rotational output of the motor 9 to the gear 13 and includes large diameter gear teeth, which are meshed with the gear 11, and small diameter gear teeth, which are meshed with the gear 13.

The gear 13 is an output gear that is rotated integrally with the shaft 7 and transmits the rotational output of the motor 9 to the shaft 7.

The sensor 14 is a valve opening degree sensor of a contactless type that senses a rotational angle of the shaft 7, i.e., an operational angle of the valve 6. The sensor 14 is fixed to the cover 3. The sensor 14 senses the operational angle of the valve 6 based on a change in a density of a magnetic flux generated from a magnet 15 that is fixed to the gear 13.

Characteristics of First Embodiment

A material of the body 2 is aluminum-based metal. A receiving surface 51, against which the compression surface of the gasket 4 resiliently contacts, is formed at the first opposing surface 26 of the body 2.

The receiving surface 51 is shaped into a ring form that corresponds to the shape of the gasket 4. A width of the receiving surface 51, which is measured in a width direction of the receiving surface 51 that is perpendicular to the compressing direction of the gasket 4 and a circumferential direction of the gasket 4, is slightly larger than a width of the gasket 4. Furthermore, the receiving surface 51 is formed to surround the gear receiving chamber 23.

Figure 2:
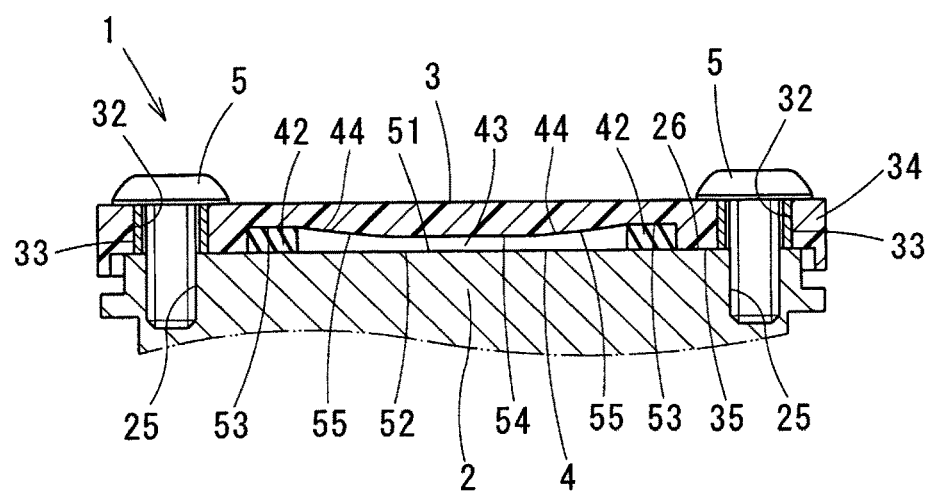
FIG. 2 is a cross-sectional view taken along line II-II in FIG. 1 (first embodiment).

As shown in FIG. 2, the receiving surface 51 is shaped into a uniformly planar surface form.

Figure 3:
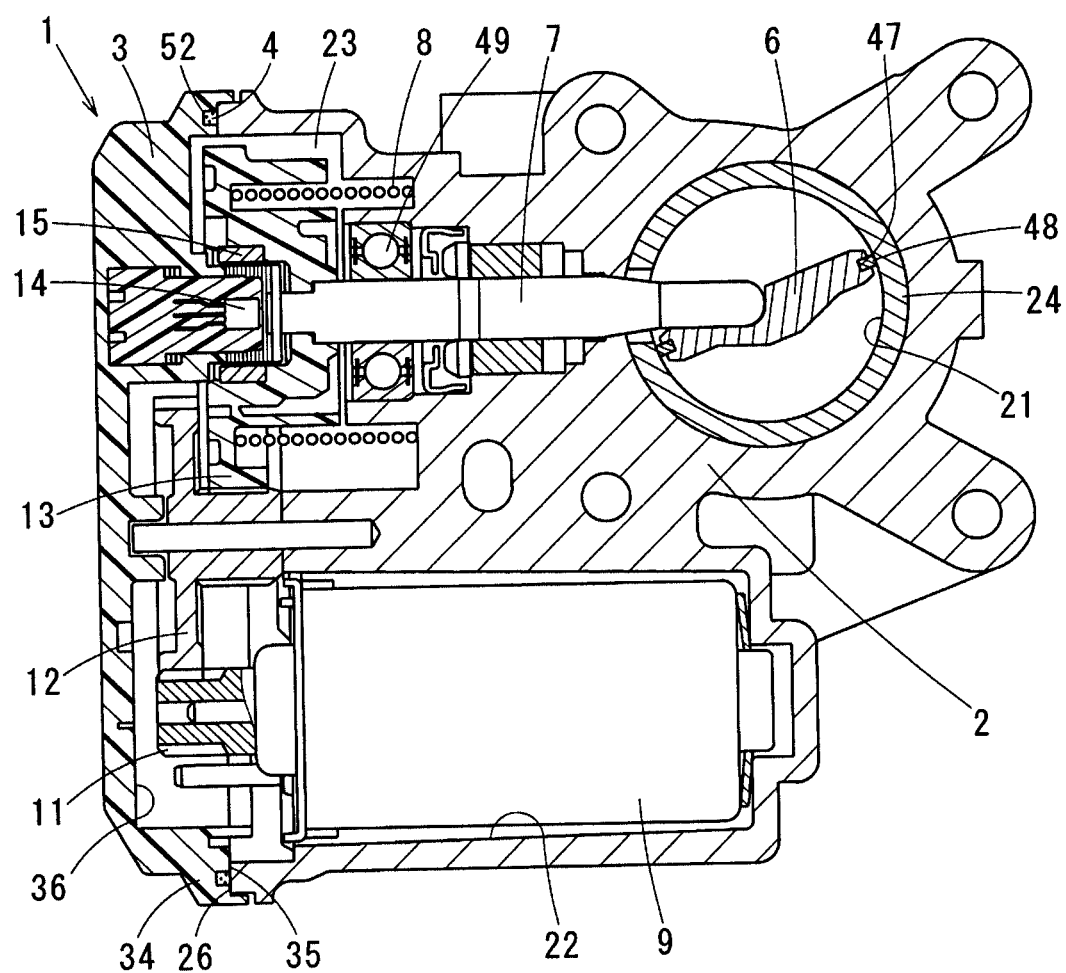
FIG. 3 is a cross-sectional view taken along line III-III in FIG. 1 (first embodiment).
Figure 4:
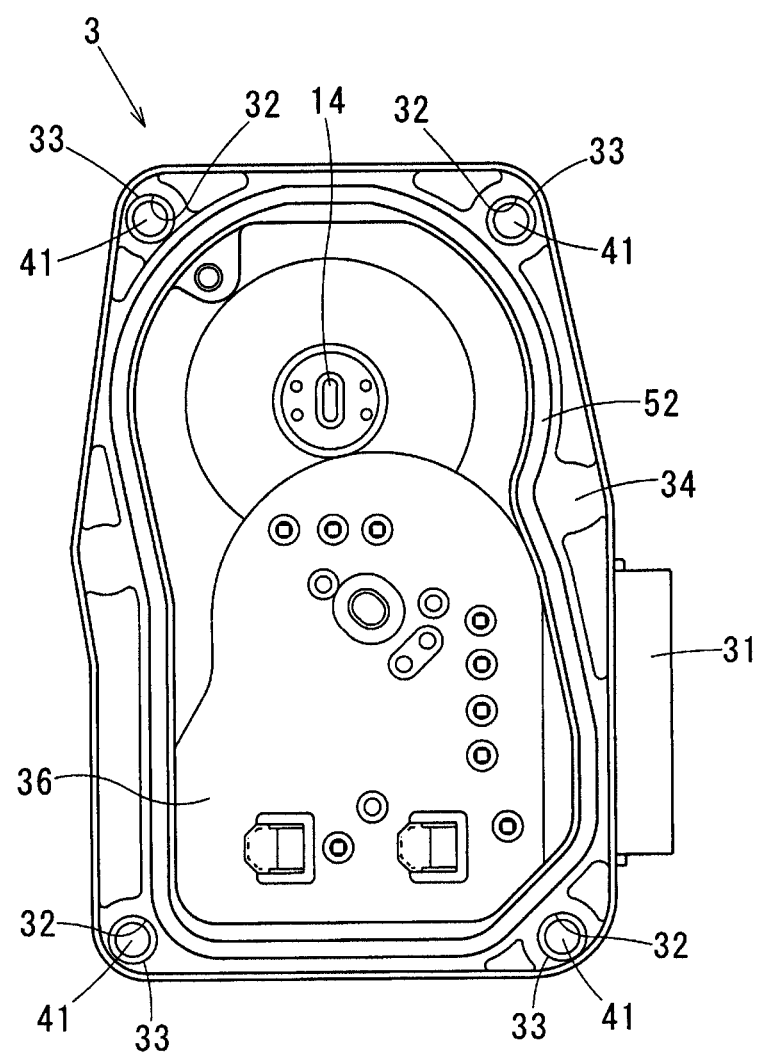
FIG. 4 is a plan view showing an inner surface of a cover (first embodiment).

A material of the cover 3 is synthetic resin. As shown in FIGS. 2 to 4, a gasket groove 52, which is shaped into a ring form and receives the gasket 4, is formed at the second opposing surface 35 of the cover 3. The gasket groove 52 includes: a plurality of fixation-segment-side bottom surfaces 53, against which compression surfaces of the fixation segments 42 respectively resiliently contact; and a plurality of center-segment-side bottom surfaces 54, against which compression surfaces of the center segments 43 respectively resiliently contact.

Each fixation-segment-side bottom surface 53 is a bottom surface of the gasket groove 52 that is opposed to the compression surface of the corresponding fixation segment 42.

Each center-segment-side bottom surface 54 is a bottom surface of the gasket groove 52 that is opposed to the compression surface of the corresponding center segment 43. As shown in FIG. 2, a depth of each center-segment-side bottom surface 54 is smaller than a depth of each fixation-segment-side bottom surface 53. Specifically, the center-segment-side bottom surface 54 is a cover-side protrusion that protrudes further toward the body side in the stacking direction than the fixation-segment-side bottom surface 53.

Furthermore, each tilt surface (slope) 55, against which a compression surface of a corresponding one of a plurality of connection segments 44 of the gasket 4 resiliently contacts, connects between the corresponding fixation-segment-side bottom surface 53 and the corresponding center-segment-side bottom surface 54. This slope 55 is a bottom surface of the gasket groove 52 that is opposed to the compression surface of the corresponding connection segment 44 of the gasket 4. Furthermore, each slope 55 is configured such that a depth of the slope 55 is progressively increased from the corresponding center-segment-side bottom surface 54 toward the corresponding fixation-segment-side bottom surface 53.

A material of the gasket 4 is a rubber-like elastomer that is configured to be compressed at least in the stacking direction of the body 2 and the cover 3.

The gasket 4 is integrally formed in one piece from the rubber-like elastomer. The material of the gasket 4 is not limited to any particular one as long as the material has the resiliency within a predetermined resilient range. For example, synthetic rubber (e.g., ethylene propylene diene rubber (EPDM), hydrogenated nitrile rubber (H-NBR), silicone rubber, fluorine rubber (FPM)), or natural rubber may be used as the material of the gasket 4. Furthermore, thermoplastic elastomer, which is a mixture of polypropylene (PP) and EPDM, may be used as the material of the gasket 4.

Additionally, a material, which is formed by blending a plurality of types of synthetic rubber and/or natural rubber, may be used as the rubber-like elastomer. Furthermore, an outer shape or a cross-sectional shape of the gasket 4 may be changed to correspond with a shape (space shape) of the gear receiving chamber 23.

The gasket 4 is seamlessly formed into the ring form in the circumferential direction. The thickness of the gasket 4 measured in the stacking direction (hereinafter also referred to as the compressing direction) is constant in the circumferential direction of the gasket 4. The compression surface is formed at each of two opposed surfaces of the gasket 4, which are opposed to each other in the compressing direction. Furthermore, in the state where the gasket 4 is inserted into the gasket groove 52 before the time of clamping the gasket 4 between the body 2 and the cover 3, the thickness of the gasket 4 measured in the compressing direction is larger than the depth of the gasket groove 52. In this way, the gasket 4 is received in the gasket groove 52 in the state where a body-side compression surface of the gasket 4 located on the body 2 side protrudes from the gasket groove 52. Furthermore, when the gasket 4 is clamped between the body 2 and the cover 3 in the state where the gasket 4 is installed in the gasket groove 52, the gasket 4 hermetically seals the gap between the body 2 and the cover 3.

Here, a plurality of points, at each of which the two components, i.e., the body 2 and the cover 3 are fixed together by a corresponding one of the screws 5, is defined as a plurality of fixing points 41. The gasket 4 includes: the plurality of fixation segments 42, each of which is placed in the immediate vicinity of the corresponding one of the fixing points 41; the plurality of center segments 43, each of which is located between corresponding two of the fixation segments 42; and the plurality of connection segments 44, each of which connects between a corresponding one of the fixation segments 42 and a corresponding one of the center segments 43.

Each of the fixing points 41 is the point, at which the female-threaded hole 25 or the insertion hole 32 is formed, and the cover 3 is fixed to the body 2 by the corresponding screw 5.

Figure 5:
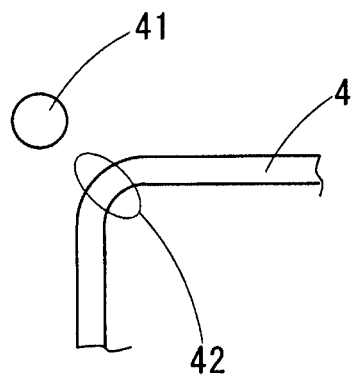
FIG. 5 is a descriptive diagram showing a positional relationship between a fixation segment of a gasket and a fixing point (first embodiment).

As shown in FIG. 5, each of the fixation segments 42 is the portion of the gasket 4, which is closest to the corresponding one of the fixing points 41. Specifically, each of the fixation segments 42 is placed in the immediate vicinity of the corresponding one of the fixing points 41 that respectively correspond to the screws 5.

The fixation segments 42 are clamped between the two components, i.e., the body 2 and the cover 3 to seal the gap between the receiving surface 51 and the fixation-segment-side bottom surface 53.

A cover-side compression surface, which is located on the cover side and tightly contacts the corresponding fixation-segment-side bottom surface 53, is formed at one end surface (an upper end surface in FIG. 2) of each fixation segment 42, which is located at one end of the fixation segment 42 in the compressing direction. A body-side compression surface, which is located on the body side and tightly contacts the receiving surface 51, is formed at the other end surface (a lower end surface in FIG. 2) of each fixation segment 42, which is located at the other end of the fixation segment 42 in the compressing direction.

Each of the center segments 43 is placed between adjacent two of the fixation segments 42.

The center segments 43 are clamped between the two components, i.e., the body 2 and the cover 3 to seal the gap between the receiving surface 51 and the corresponding center-segment-side bottom surface 54.

A cover-side compression surface, which is located on the cover side and tightly contacts the corresponding center-segment-side bottom surface 54, is formed at one end surface (an upper end surface in FIG. 2) of each center segment 43, which is located at one end of the center segment 43 in the compressing direction. A body-side compression surface, which is located on the body side and tightly contacts the corresponding receiving surface 51, is formed at the other end surface (a lower end surface in FIG. 2) of each center segment 43, which is located at the other end of the center segments 43 in the compressing direction.

Figure 6:
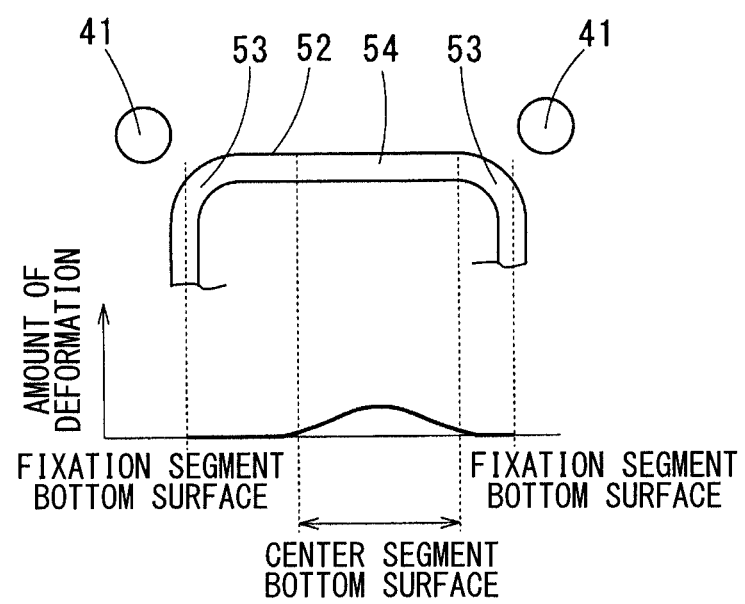
FIG. 6 is a descriptive diagram showing an amount of deformation of the cover (first embodiment).

Each of the center segments 43 is a portion of the gasket 4, which resiliently contacts the corresponding center-segment-side bottom surface 54 while the amount of resilient deformation of the cover 3 in the stacking direction at the center-segment-side bottom surface 54 caused by, for example, a resilient repulsive force of the gasket 4 or a temperature change is larger than the amount of resilient deformation of the cover 3 in the stacking direction at the fixation-segment-side bottom surface 53 as shown in FIG. 6. The resilient deformation of the cover 3 in the stacking direction is defined as resilient deformation of the cover 3 that causes expansion of the gap between the body 2 and the cover 3 in the stacking direction.

The gasket 4, which is shaped into the ring form, is manufactured by the manufacturing method that includes slicing a molded body (rubber-like elastomer), which is molded into a tubular form, at a predetermined thickness.

Figure 7:
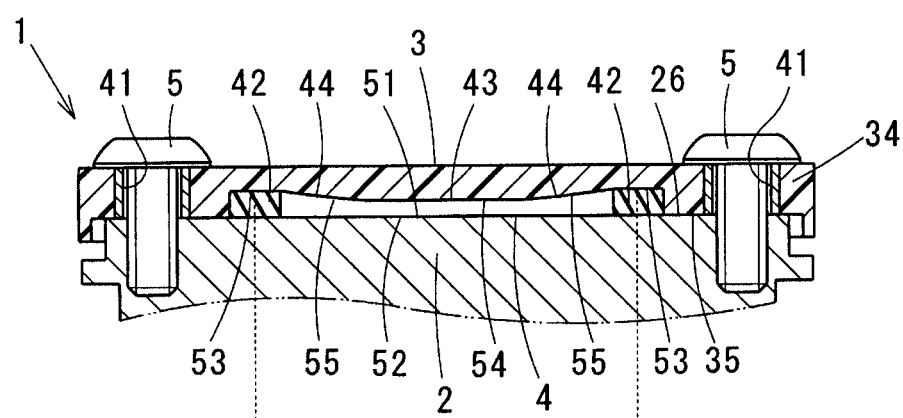
FIG. 7(a) is a cross-sectional view showing the valve device, in which the gasket is clamped.
FIG. 7(b) is a descriptive view indicating a preset compression ratio of the gasket and a compression ratio (actual) of the gasket after resilient deformation of the cover (first embodiment).
Figure 7:
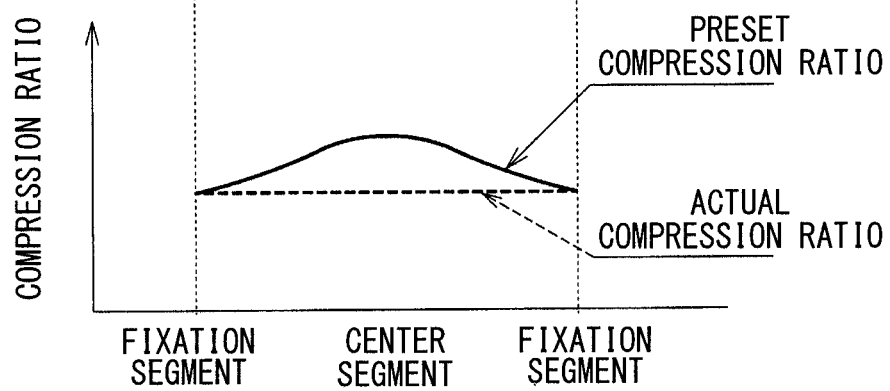

As shown in FIG. 7, the preset compression ratio of the gasket 4 in the compressing direction is set to be larger at the center segments 43 than at the fixation segments 42. In order to set the preset compression ratio in the above-described manner, the depth of each center-segment-side bottom surface 54 is set to be smaller than the depth of each of the fixation-segment-side bottom surfaces 53 at the cover 3.

In this way, the amount of protrusion of the gasket 4 from the gasket groove 52 is larger at the center segments 43 than at the fixation segments 42.

Here, the preset compression ratio of the gasket 4 refers to each of the compression ratio of the respective fixation segments 42 and the compression ratio of the respective center segments 43 at the time of assembling the body 2 and the cover 3 while maintaining original shapes of the body 2 and the cover 3 that are shapes of the body 2 and the cover 3 before the assembling. Therefore, the preset compression ratio of the gasket 4 varies in the circumferential direction of the gasket 4.

The preset compression ratio of the fixation segment 42 satisfies the following equation 1 where T1 indicates a thickness of the fixation segment 42, which is measured in the compressing direction before the time of clamping the fixation segment 42 between the body 2 and the cover 3, and t1 indicates a reduced thickness of the fixation segment 42, which is measured in the compressing direction and is reduced through the compression at the time of clamping the fixation segment 42 between the body 2 and the cover 3. Here, the reduced thickness t1 refers to a difference between the thickness T1 of the fixation segment 42, which is measured in the compressing direction before the compression, and the thickness of the fixation segment 42, which is measured in the compressing direction after the compression.

Furthermore, the preset compression ratio of the center segment 43 satisfies the following equation 2 where T2 indicates a thickness of the center segment 43, which is measured in the compressing direction before the time of clamping the center segment 43 between the body 2 and the cover 3, and t2 indicates a reduced thickness of the center segment 43, which is measured in the compressing direction and is reduced through the compression at the time of clamping the center segment 43 between the body 2 and the cover 3. Here, the reduced thickness t2 refers to a difference between the thickness T2 of the center segment 43, which is measured in the compressing direction before the compression, and the thickness of the center segments 43, which is measured in the compressing direction after the compression.

Preset Compression Ratio (%) of Fixation Segment
$42 = (t1/T1) \times 100$ (Equation 1)

Preset Compression Ratio (%) of Center Segment
$43 = (t2/T2) \times 100$ (Equation 2)

Advantages of First Embodiment

Figure 8:
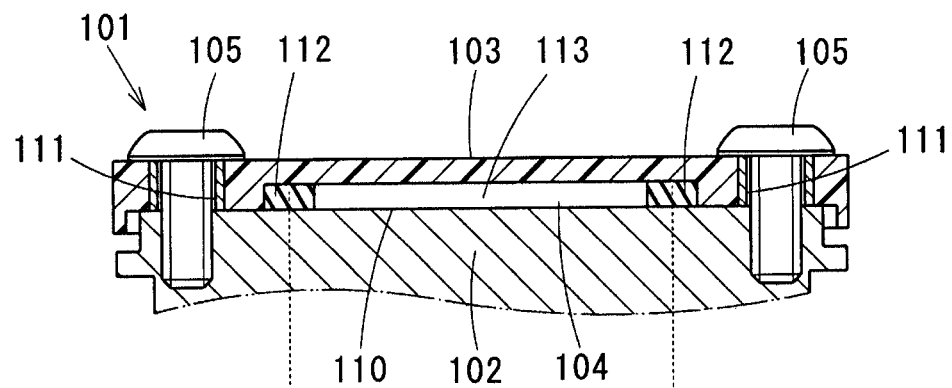
FIG. 8(a) is a cross-sectional view showing a valve device, in which a gasket is clamped.
FIG. 8(b) is a descriptive view indicating a preset compression ratio of the gasket and a compression ratio (actual) of the gasket after resilient deformation of the cover (first comparative example).
Figure 8:
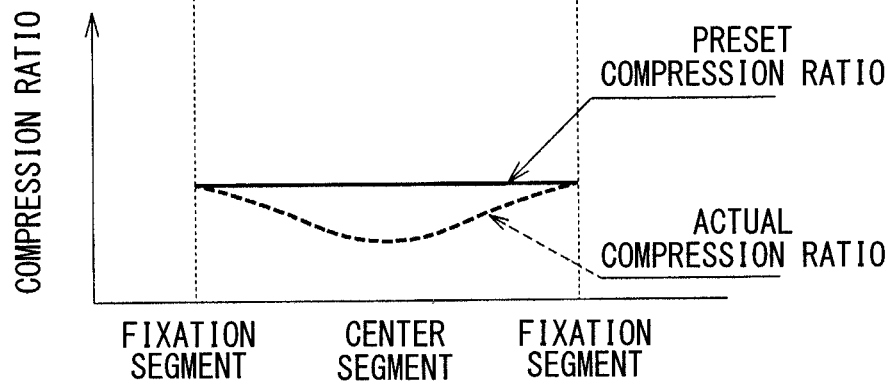

FIG. 8(a) indicates a valve device 101 of a comparative example. The valve device 101 is configured such that the gasket 104, which is shaped into the ring form, is clamped between the two components, i.e., the body 102 and the cover 103, so that the gasket 104 is compressed in the stacking direction.

The cover 103 has the gasket groove 110, which is shaped into the ring form.

The gasket 104 has the fixation segments 112, each of which is placed in the immediate vicinity of the corresponding one of the fixing points 111, at which the body 102 and the cover 103 are fixed together by the screws 105.

It is conceivable to reduce each of the number of the screws 105, the number of the fixing points 111 and the number of the fixation segments 112 from, for example, six to four in order to reduce the number of components of the valve device 101 and the number of assembling steps of the valve device 101. In this case, when a distance between adjacent two of the fixation segments 112 is increased, a compressive force of the corresponding center segment 113 located between these fixation segments 112 is reduced.

Specifically, the cover 103, which is made of the synthetic resin, is resiliently deformed due to, for example, the resilient repulsive force of the gasket 104 or the pressure change in the gear receiving chamber 23 in response to the temperature change, so that the size of the gap between the two components, i.e., the body 102 and the cover 103 in the stacking direction is increased. In this way, as shown in FIG. 8(b), the compressive force of the center segment 113 located between the fixation segments 112 is reduced in comparison to the compression ratio of the respective fixation segments 112 (=the preset compression ratio of the gasket 104).

Therefore, at the center segment 113 of the gasket 104, the hermetic sealing performance is reduced in comparison to the fixation segments 112. Thereby, the waterproof performance against the high-pressure washing water, the rainwater or the like is disadvantageously deteriorated. A dotted line of FIG. 7(b) indicates an actual compression ratio including the resilient repulsive force of the gasket 4 and the temperature change, and a dotted line of FIG. 8(b) indicates an actual compression ratio including the resilient repulsive force of the gasket 104 and the temperature change.

In the valve device 1 of the present embodiment, the compression ratio of the gasket 4 in the stacking direction, i.e., the preset compression ratio of the gasket 4 is set to be larger at the center segments 43 than at the fixation segments 42.

In this way, even when a phenomenon, which causes a reduction of the compression ratio of the center segment 43 of the gasket 4, occurs, it is possible to limit the reduction of the compression ratio of the center segment 43 to a value that is lower than the compression ratio, which can maintain the waterproofness of, for example, the gear receiving chamber 23, i.e., the compression ratio of the respective fixation segments 42.

Therefore, even when the compression ratio of the center segment 43 of the gasket 4 is reduced due to the resilient deformation of the cover 3, it is possible to ensure the waterproofness against the externally applied water with the resilient repulsive force exerted at the time of compressing the gasket 4 in the stacking direction upon clamping of the gasket 4 between the two components, i.e., the body 2 and the cover 3. Thus, the intrusion of the water from the outside to the inside of the receiving chamber can be limited without increasing the number of the screws 5, the number of the fixing points 41 and the number of the fixation segments 42.

Furthermore, the number of the screws 5, the number of the fixing points 41 and the number of the fixation segments 42 can be respectively reduced from six to four, so that the number of the components of the valve device 1 and the number of the assembling steps of the valve device 1 can be reduced to reduce the costs.

Furthermore, the amount of protrusion of the gasket 4 from the gasket groove 52 is larger at the center segments 43 than at the fixation segments 42. Thereby, even in a case where a force in a transverse direction, which is perpendicular to the stacking direction, is applied to the gasket 4 due to, for example, the application of the high-pressure washing water or the expansion or the contraction of the gear receiving chamber 23, or in a case where swelling of the gasket 4 occurs, the installed position of the gasket 4 can be maintained at an appropriate position because of the placement of the gasket 4 in the gasket groove 52. Therefore, it is possible to limit detachment of the gasket 4 from the appropriate location between the body 2 and the gasket 4.

Furthermore, the depth of the center-segment-side bottom surface 54 is set to be smaller than the depth of each of the fixation-segment-side bottom surfaces 53 at the gasket groove 52. Thereby, in the case where the material of the gasket 4 is the synthetic rubber, the two opposed surfaces (the compression surfaces) of the gasket 4, which are opposed to each other in the compressing direction, may be respectively shaped in a planar surface form.

Furthermore, there is used the manufacturing method, according to which the rubber-like elastomer in the tubular form is sliced at the predetermined thickness to form the gasket 4 that is shaped into the ring form. Thus, a plurality of gaskets 4, each of which is shaped into the ring form, can be produced from at least one rubber-like elastomer, which is shaped into the tubular form, by slicing the rubber-like elastomer at the predetermined thickness for multiple times. Thereby, the manufacturing costs can be limited.

Furthermore, the body 2 has the receiving surface 51, against which the compression surface of the gasket 4 tightly contacts. Since only the shape of the respective center-segment-side bottom surfaces 54 of the gasket groove 52 is changed, the receiving surface 51 can be in the uniformly planar surface form. Therefore, the receiving surface 51 can be easily formed by a molding process.

Furthermore, the material of the cover 3 is the synthetic resin. Therefore, the slopes 55 can be formed through the molding of the synthetic resin, so that the surface roughness of the slopes 55 can be improved. Thus, the degree of adhesion of the gasket 4 to the slopes 55 is improved, so that the waterproofness against the externally applied water can be enhanced.

Furthermore, an increase in the rigidity of the cover 3 can be expected by forming the center-segment-side bottom surfaces 54, each of which is in the form of protrusion, at the gasket groove 52 of the cover 3 made of the synthetic resin.

Construction of Second Embodiment

Figure 9:
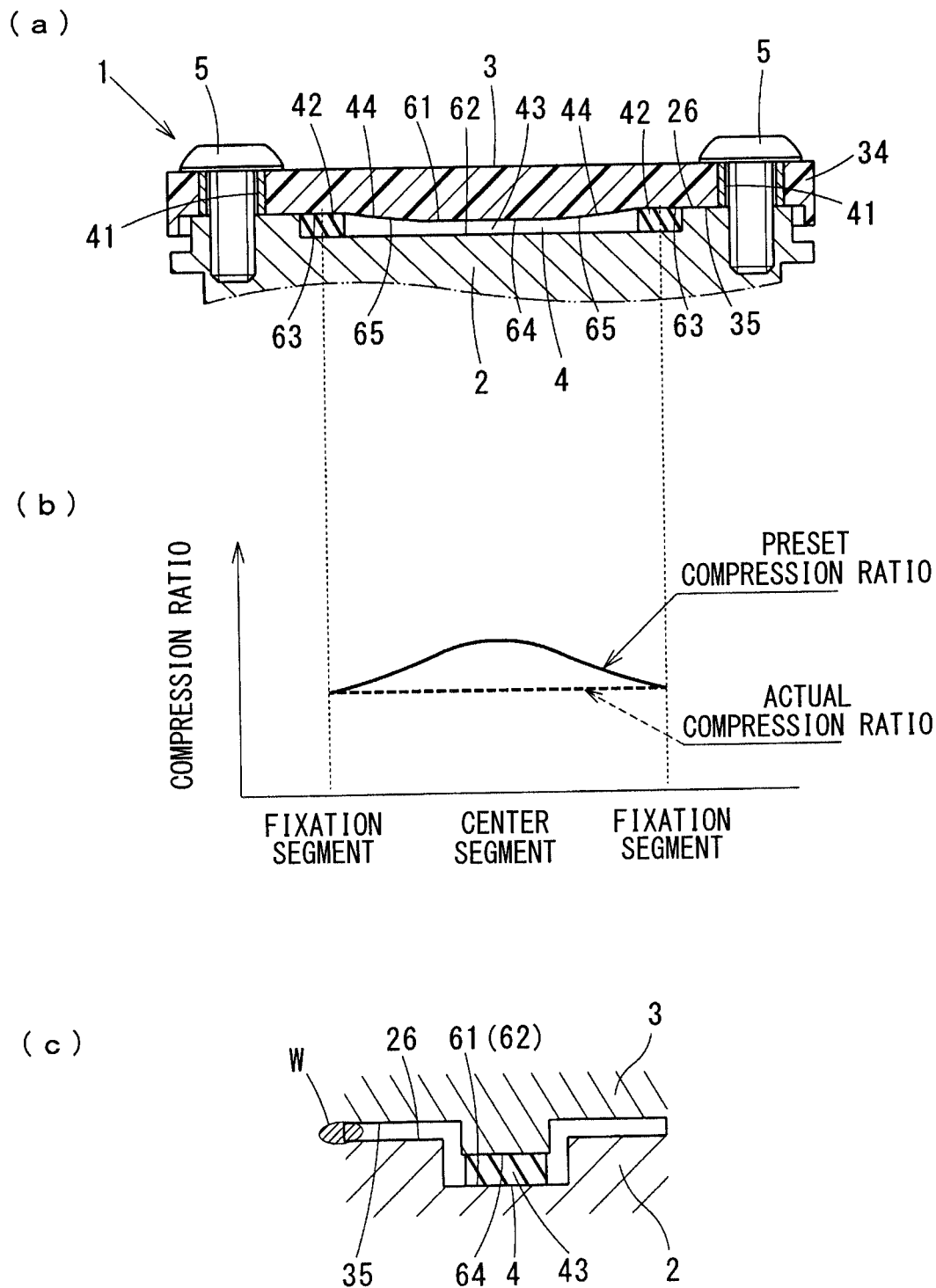
FIG. 9(a) is a cross-sectional view showing a valve device, in which a gasket is clamped.
FIG. 9(b) is a descriptive view indicating a preset compression ratio of the gasket and a compression ratio (actual) of the gasket after resilient deformation of the cover, and FIG. 9 (c) is a detailed enlarged cross sectional view showing a main feature (second embodiment).

FIG. 9 shows a second embodiment of the present disclosure.

In the following discussion, the reference signs used in the first embodiment indicate the same structures or functions as those of the first embodiment, and thereby the description of the same structures or functions will be omitted for the sake of simplicity.

A gasket groove 61, which is shaped into a ring form and receives the gasket 4, is formed at the first opposing surface 26 of the body 2 of the present embodiment. A bottom surface 62, against which the compression surface of the gasket 4 resiliently contacts, is formed at the gasket groove 61.

The bottom surface 62 is shaped into a ring form that corresponds to the shape of the gasket 4. A width of the bottom surface 62, which is measured in the width direction of the bottom surface 62 that is perpendicular to the compressing direction of the gasket 4 and the circumferential direction of the gasket 4, is slightly larger than the width of the gasket 4. Furthermore, the bottom surface 62 is formed to surround the gear receiving chamber 23.

As shown in FIG. 9(a), the bottom surface 62 is shaped into a uniformly planar surface form.

Furthermore, the second opposing surface 35 of the cover 3 includes: a plurality of fixation-segment receiving surfaces 63, against which the compression surfaces of the fixation segments 42 respectively resiliently contact; and a plurality of center-segment receiving surfaces 64, against which the compression surfaces of the center segments 43 respectively resiliently contact.

Each center-segment receiving surface 64 is in a form of protrusion and protrudes further toward the body side in the stacking direction than the fixation-segment receiving surfaces 63. Each slope 65, against which the compression surface of the corresponding connection segment 44 resiliently contacts, connects between the corresponding fixation-segment receiving surface 63 and the corresponding center-segment receiving surface 64. The slope 65 is configured such that a depth of the slope 65 is progressively increased from the center-segment receiving surface 64 toward the corresponding fixation-segment receiving surface 63. Thereby, the preset compression ratio of the gasket 4 is set to be larger at the center segments 43 than at the fixation segments 42, as shown in FIG. 9(b).

The gasket 4, which is shaped into the ring form, is manufactured by the manufacturing method that includes the slicing of the rubber-like elastomer, which is molded into the tubular form, at the predetermined thickness like in the first embodiment.

As discussed above, the valve device 1 of the present embodiment achieves advantages, which are similar to those of the first embodiment.

Furthermore, each center-segment receiving surface 64 of the cover 3 is in the form of protrusion and protrudes further toward the body side in the stacking direction than the fixation-segment receiving surfaces 63. Therefore, it is only required to shape each of the two opposed surfaces (the compression surfaces) of the gasket 4, which are opposed to each other in the compressing direction, in the planar surface form.

Furthermore, there is used the manufacturing method, according to which the rubber-like elastomer in the tubular form is sliced at the predetermined thickness to form the gasket 4 that is shaped into the ring form. Thus, the plurality of gaskets 4, each of which is shaped into the ring form, can be produced from at least one rubber-like elastomer, which is shaped into the tubular form, by slicing the rubber-like elastomer at the predetermined thickness for multiple times. Thereby, the manufacturing costs can be limited.

A protruding part of the center-segment receiving surface 64 of the cover 3 is fitted into the gasket groove 61 of the body 2. Thereby, as shown in FIG. 9(c), a maze structure is formed, so that the waterproofness against the externally applied water W can be further enhanced.

Construction of Third Embodiment

Figure 10:
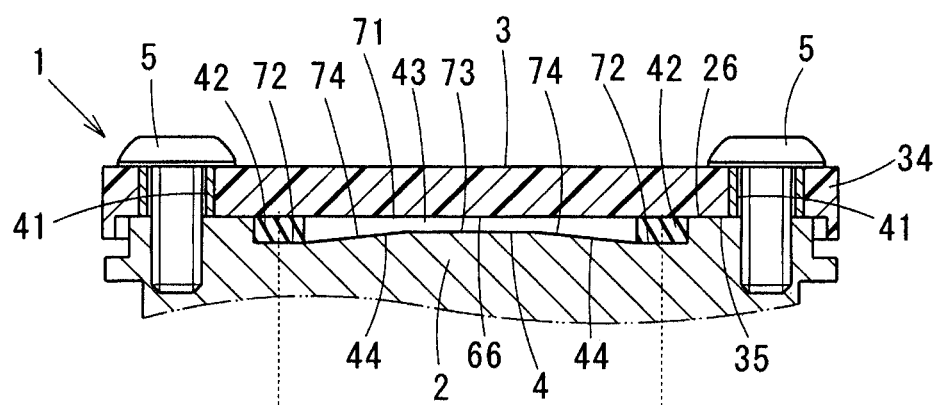
FIG. 10(a) is a cross-sectional view showing a valve device, in which a gasket is clamped.
FIG. 10(b) is a descriptive view indicating a preset compression ratio of the gasket and a compression ratio (actual) of the gasket after resilient deformation of the cover (third embodiment).
Figure 10:
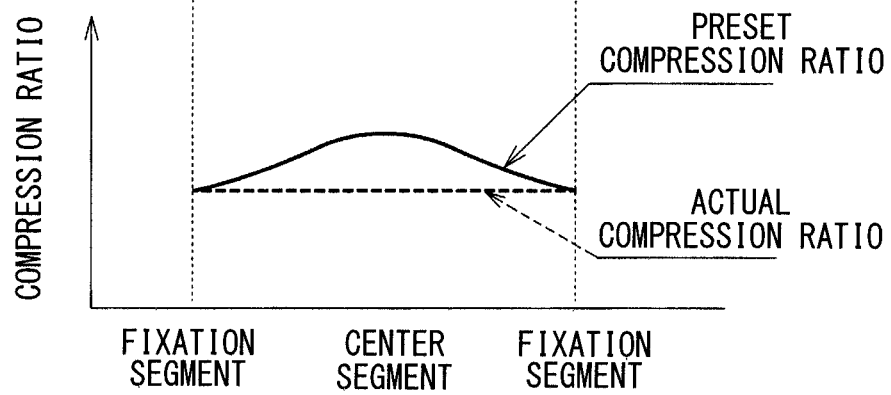

FIG. 10 shows a third embodiment of the present disclosure.

In the following discussion, the reference signs used in the first and second embodiments indicate the same structures or functions as those of the first and second embodiments, and thereby the description of the same structures or functions will be omitted for the sake of simplicity.

A receiving surface 66, against which the compression surface of the gasket 4 resiliently contacts, is formed at the second opposing surface 35 of the cover 3 of the present embodiment.

As shown in FIG. 10(a), the receiving surface 66 is shaped into a uniformly planar surface form.

A gasket groove 71, which receives the gasket 4, is formed at the first opposing surface 26 of the body 2. The gasket groove 71 includes: a plurality of fixation-segment-side bottom surfaces 72, against which the compression surfaces of the fixation segments 42 respectively resiliently contact; and a plurality of center-segment-side bottom surfaces 73, against which the compression surfaces of the center segments 43 respectively resiliently contact.

Each fixation-segment-side bottom surface 72 is a bottom surface of the gasket groove 71 that is opposed to the compression surface of the corresponding fixation segment 42.

Each center-segment-side bottom surface 73 is a bottom surface of the gasket groove 71 that is opposed to the compression surface of the corresponding center segment 43. The depth of the center-segment-side bottom surface 73 is set to be smaller than the depth of each of the fixation-segment-side bottom surfaces 72. Specifically, the center-segment-side bottom surface 73 is a body-side protrusion that protrudes further toward the cover side in the stacking direction than the fixation-segment-side bottom surfaces 72.

Each slope 74, against which the compression surface of the corresponding connection segment 44 resiliently contacts, connects between the corresponding fixation-segment-side bottom surface 72 and the corresponding center-segment-side bottom surface 73. The slope 74 is a bottom surface of the gasket groove 71 that is opposed to the compression surface of the corresponding connection segment 44. Furthermore, the slope 74 is configured such that a depth of the slope 74 is progressively increased from the center-segment-side bottom surface 73 toward the fixation-segment-side bottom surface 72. Thereby, the preset compression ratio of the gasket 4 is set to be larger at the center segments 43 than at the fixation segments 42, as shown in FIG. 10(b).

The gasket 4, which is shaped into the ring form, is manufactured by the manufacturing method that includes the slicing of the rubber-like elastomer, which is molded into the tubular form, at the predetermined thickness like in the first embodiment.

As discussed above, the valve device 1 of the present embodiment achieves advantages, which are similar to those of the first and second embodiments.

Furthermore, the depth of the center-segment-side bottom surface 73 is set to be smaller than the depth of each of the adjacent fixation-segment-side bottom surfaces 72 at the gasket groove 71. Thereby, in the case where the material of the gasket 4 is the synthetic rubber, the two opposed surfaces (the compression surfaces) of the gasket 4, which are opposed to each other in the compressing direction, may be respectively shaped in a planar surface form.

Furthermore, there is used the manufacturing method, according to which the rubber-like elastomer in the tubular form is sliced at the predetermined thickness to form the gasket 4 that is shaped into the ring form. Thus, the plurality of gaskets 4, each of which is shaped into the ring form, can be produced from at least one rubber-like elastomer, which is shaped into the tubular form, by slicing the rubber-like elastomer at the predetermined thickness for multiple times. Thereby, the manufacturing costs can be limited.

The receiving surface 66 of the cover 3 can be set to the uniformly planar surface form, so that the receiving surface 66 can be easily formed by the resin molding or a cutting process.

A material of the body 2 is metal. Thereby, in comparison to the cover 3, which is made of the synthetic resin, the body 2, which is made of the metal, has the higher rigidity and is less susceptible to the influence of the expansion and the contraction in the gear receiving chamber 23. Therefore, it is not necessary to consider the height of the center-segment-side bottom surface 73 and the height of the slope 74 in view of the resilient deformation of the body 2. Thus, the number of times of trial and error in designing of the shape of the body 2 is reduced. As a result, the setting of the slope 74 relative to the gasket groove 71 of the body 2 is easy.

Construction of Fourth Embodiment

Figure 11:
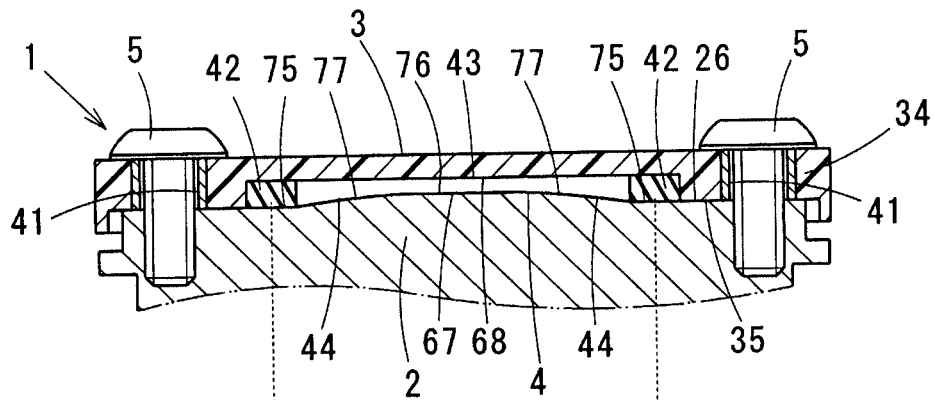
FIG. 11(a) is a cross-sectional view showing a valve device, in which a gasket is clamped.
FIG. 11(b) is a descriptive view indicating a preset compression ratio of the gasket and a compression ratio (actual) of the gasket after resilient deformation of the cover, and FIG. 11 (c) is a detailed enlarged cross sectional view showing a main feature (fourth embodiment).
Figure 11:
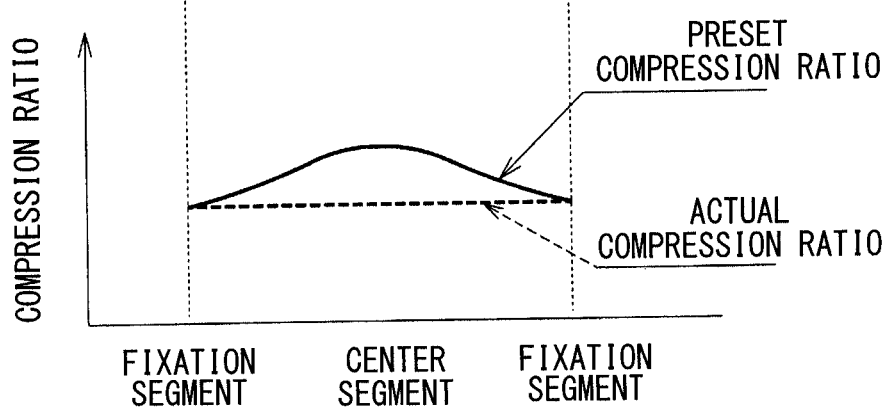
Figure 11:
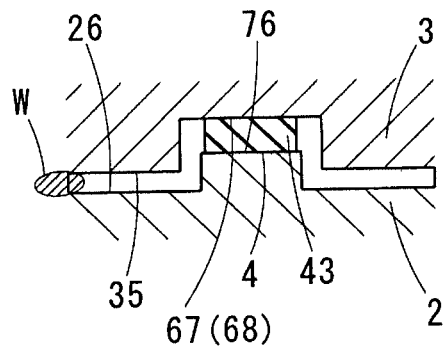

FIG. 11 shows a fourth embodiment of the present disclosure.

In the following discussion, the reference signs used in the first to third embodiments indicate the same structures or functions as those of the first to third embodiments, and thereby the description of the same structures or functions will be omitted for the sake of simplicity.

A gasket groove 67, which is shaped into a ring form and receives the gasket 4, is formed at the second opposing surface 35 of the cover 3 of the present embodiment. A bottom surface 68, against which the compression surface of the gasket 4 resiliently contacts, is formed at the gasket groove 67.

The bottom surface 68 is shaped into a ring form that corresponds to the shape of the gasket 4. A width of the bottom surface 68, which is measured in the width direction of the bottom surface 68 that is perpendicular to the compressing direction of the gasket 4 and the circumferential direction of the gasket 4, is slightly larger than the width of the gasket 4.

As shown in FIG. 11(a), the bottom surface 68 is shaped into a uniformly planar surface form.

Furthermore, the first opposing surface 26 of the body 2 includes: a plurality of fixation-segment receiving surfaces 75, against which the compression surfaces of the fixation segments 42 respectively resiliently contact; and a plurality of center-segment receiving surfaces 76, against which the compression surfaces of the center segments 43 respectively resiliently contact.

Each center-segment receiving surface 76 is in a form of protrusion and protrudes further toward the cover side in the stacking direction than the fixation-segment receiving surfaces 75. Each slope 77, against which the compression surface of the corresponding connection segment 44 resiliently contacts, connects between the corresponding fixation-segment receiving surface 75 and the corresponding center-segment receiving surface 76. The slope 77 is configured such that a depth of the slope 77 is progressively increased from the center-segment receiving surface 76 toward the fixation-segment receiving surface 75. Thereby, the preset compression ratio of the gasket 4 is set to be larger at the center segments 43 than at the fixation segments 42, as shown in FIG. 11(b).

The gasket 4, which is shaped into the ring form, is manufactured by the manufacturing method that includes the slicing of the molded body (the rubber-like elastomer), which is molded into the tubular form, at the predetermined thickness like in the first embodiment.

As discussed above, the valve device 1 of the present embodiment achieves advantages, which are similar to those of the first to third embodiments.

Furthermore, each center-segment receiving surface 76 of the body 2 is in a form of protrusion and protrudes further toward the cover side in the stacking direction than the fixation-segment receiving surfaces 75. Therefore, it is only required to shape each of the two opposed surfaces (the compression surfaces) of the gasket 4, which are opposed to each other in the compressing direction, in the planar surface form.

By using the above-described manufacturing method, the plurality of gaskets 4, each of which is shaped into the ring form, can be produced. Thus, the plurality of gaskets 4, each of which is shaped into the ring form, can be produced from at least one rubber-like elastomer, which is shaped into the tubular form, by slicing the rubber-like elastomer at the predetermined thickness for multiple times. Thereby, the manufacturing costs can be limited.

The protruding part of the body 2, which is the center-segment receiving surface 76, is fitted into the gasket groove 67 of the cover 3. Thereby, as shown in FIG. 11(c), a maze structure is formed, so that the waterproofness against the externally applied water W can be further enhanced.

Construction of Fifth Embodiment

Figure 12:
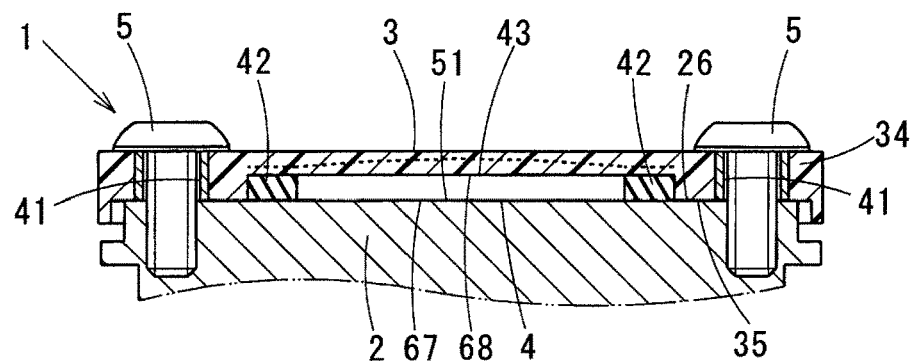
FIG. 12 is a cross-sectional view showing a valve device, in which a gasket is clamped (fifth embodiment).
Figure 13:
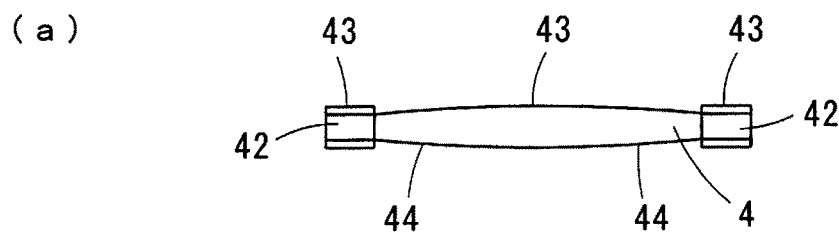
FIG. 13(a) is a side view showing the gasket.
FIG. 13(b) is a plan view showing the gasket (fifth embodiment).
Figure 13:
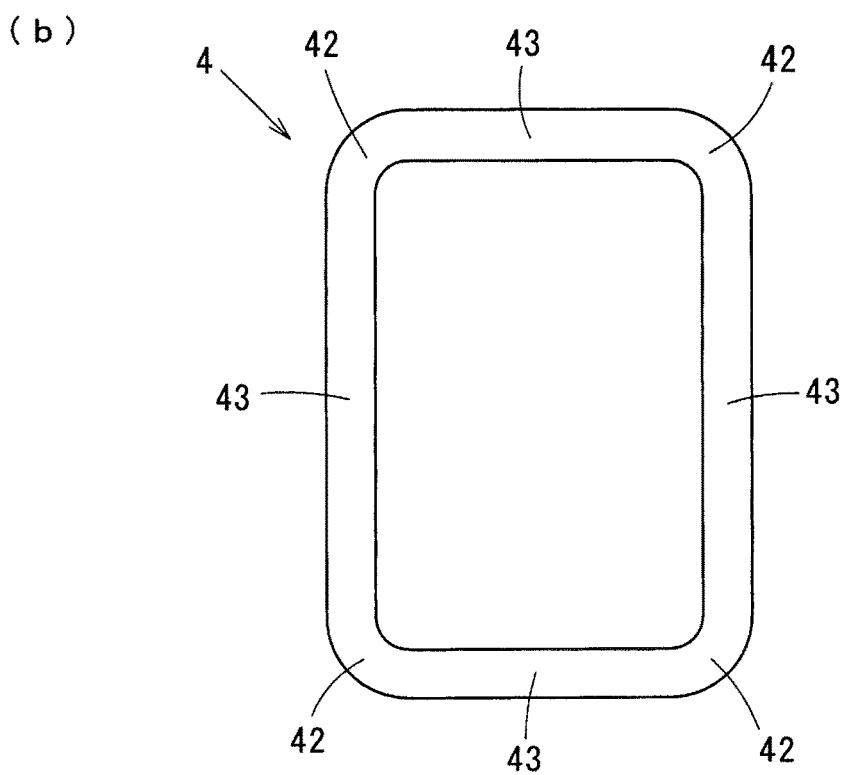

FIGS. 12 and 13 show a fifth embodiment of the present disclosure.

In the following discussion, the reference signs used in the first to fourth embodiments indicate the same structures or functions as those of the first to fourth embodiments, and thereby the description of the same structures or functions will be omitted for the sake of simplicity.

The receiving surface 51 is formed at the first opposing surface 26 of the body 2 of the present embodiment.

Furthermore, the gasket groove 67 is formed at the second opposing surface 35 of the cover 3. The bottom surface 68 is formed at the gasket groove 67.

Furthermore, the thickness of the gasket 4 measured in the stacking direction is larger at the center segments 43 than at the fixation segments 42. Thereby, the preset compression ratio of the gasket 4 is set to be larger at the center segments 43 than at the fixation segments 42.

As discussed above, the valve device 1 of the present embodiment achieves advantages, which are similar to those of the first to fourth embodiments.

Furthermore, the thickness of the gasket 4 measured in the stacking direction is larger at the center segments 43 than at the fixation segments 42.

Thereby, it is not required to change the shape of the body 2 and the shape of the cover 3, so that it is easy to cope with variations in the temperature environment, in which the valve device 1 is used.

Here, in a case where the shape of the receiving surface 51 and/or the shape of the bottom surface 68, which closely contact the corresponding compression surface of the center segments 43, is changed (e.g., increasing the thickness) without changing the thickness of the gasket 4 in the stacking direction, even if the internal pressure of the gear receiving chamber 23 is increased under the high temperature environment, the cover 3 made of the synthetic resin is less likely deformed. Therefore, a crack may possibly be generated at the cover 3. However, according to the present embodiment, such a disadvantage is less likely to occur.

Construction of Sixth Embodiment

Figure 14:
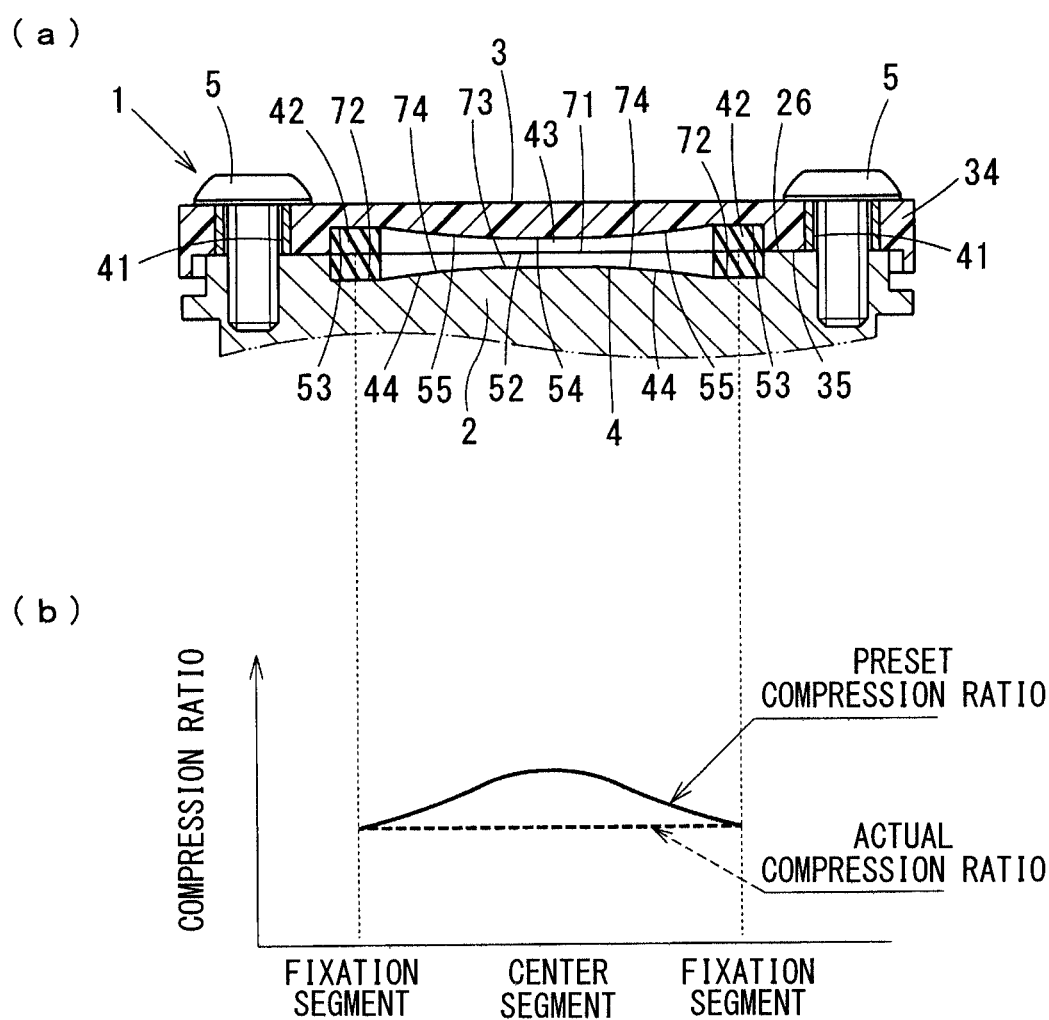
FIG. 14(a) is a cross-sectional view showing a valve device, in which a gasket is clamped.
FIG. 14(b) is a descriptive view indicating a preset compression ratio of the gasket and a compression ratio (actual) of the gasket after resilient deformation of the cover (sixth embodiment).

FIG. 14 shows a sixth embodiment of the present disclosure.

In the following discussion, the reference signs used in the first to fifth embodiments indicate the same structures or functions as those of the first to fifth embodiments, and thereby the description of the same structures or functions will be omitted for the sake of simplicity.

In the present embodiment, the gasket groove 71, which is formed at the body 2, includes a plurality of fixation-segment-side bottom surfaces 72 and a plurality of center-segment-side bottom surfaces 73. Each slope 74 connects between the corresponding fixation-segment-side bottom surface 72 and the corresponding center-segment-side bottom surface 73.

The gasket groove 52, which is formed at the cover 3, includes the fixation-segment-side bottom surfaces 53, the center-segment-side bottom surfaces 54 and the slopes 55.

Specifically, according to the sixth embodiment, the gasket grooves 71, 52 are formed at the body 2 and the cover 3, respectively, so that the gasket groove 71, which is formed at the body 2, and the gasket groove 52, which is formed at the cover 3, are opposed to each other to form the groove that receives the gasket 4.

As shown in FIG. 14(a), a depth of each center-segment-side bottom surface 73 is smaller than a depth of each fixation-segment-side bottom surface 72. Also, as shown in FIG. 14(a), the depth of the center-segment-side bottom surface 54 is smaller than the depth of the fixation-segment-side bottom surface 53. Thereby, the preset compression ratio of the gasket 4 is set to be larger at the center segments 43 than at the fixation segments 42, as shown in FIG. 14(b).

As discussed above, the valve device 1 of the present embodiment achieves advantages, which are similar to those of the first to fifth embodiments.

Furthermore, the cover 3 of the first embodiment and the body 2 of the third embodiment are combined together, so that the required feature is divided between these components. Therefore, it becomes easier to deal with the reduction in the compression ratio between the complicated fixation segments 42.

Construction of Seventh Embodiment

Figure 15:
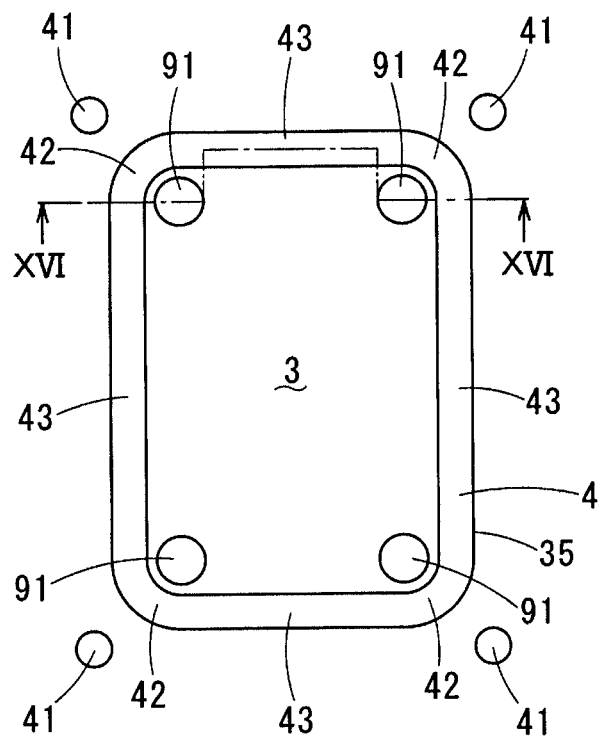
FIG. 15 is a plan view showing an example where a gasket is placed at an inner surface of a cover (seventh embodiment).
Figure 16:
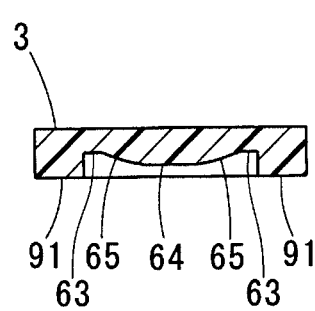
FIG. 16 is a cross-sectional view taken along line XVI-XVI in FIG. 15 (seventh embodiment).

FIGS. 15 and 16 show a seventh embodiment of the present disclosure.

In the following discussion, the reference signs used in the first to sixth embodiments indicate the same structures or functions as those of the first to sixth embodiments, and thereby the description of the same structures or functions will be omitted for the sake of simplicity.

The body 2 and the cover 3 of the present embodiment adopt a structure without a gasket groove.

A receiving surface (not shown), against which the compression surface of the gasket 4 resiliently contacts, is formed at the first opposing surface 26 of the body 2.

Furthermore, a plurality of pins 91, each of which is shaped into a cylindrical form and defines a height of the gasket 4 in the compressing direction, is formed at each of the body 2 and the cover 3. The pins at the body side are not depicted for the sake of simplicity. Each of the pins at the body side contacts a corresponding one of the pins 91 at the cover side. Alternative to the pins at the body 2, a wall, which is shaped into a planar form and contacts the pins 91, may be formed at the body 2.

The second opposing surface 35 of the cover 3 includes the fixation-segment receiving surfaces 63, the center-segment receiving surfaces 64 and the slopes 65. Each center-segment receiving surface 64 is in a form of protrusion and protrudes further toward the body side in the stacking direction than the fixation-segment receiving surfaces 63. Specifically, the cover 3 includes the center-segment receiving surfaces 64, each of which is in the form of protrusion, and the contact surfaces of the gasket 4, which are formed along the perimeter of the gasket 4, resiliently contact against the center-segment receiving surfaces 64, respectively. Thereby, the preset compression ratio of the gasket 4 is set to be larger at the center segments 43 than at the fixation segments 42.

As discussed above, the valve device 1 of the present embodiment achieves advantages, which are similar to those of the first to sixth embodiments.

Construction of Eighth Embodiment

Figure 17:
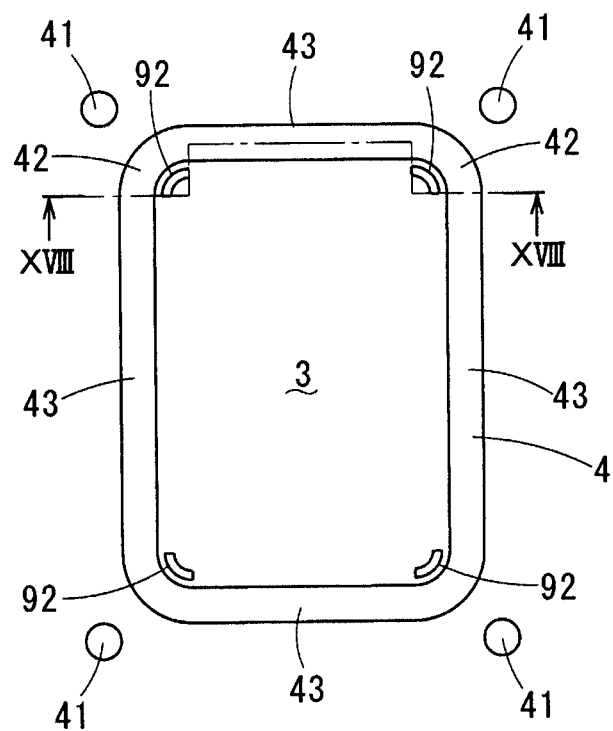
FIG. 17 is a plan view showing an example where a gasket is placed at an inner surface of a cover (eighth embodiment).
Figure 18:
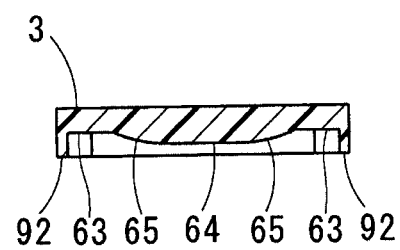
FIG. 18 is a cross-sectional view taken along line XVIII-XVIII in FIG. 17 (eighth embodiment).

FIGS. 17 and 18 show an eighth embodiment of the present disclosure.

In the following discussion, the reference signs used in the first to seventh embodiments indicate the same structures or functions as those of the first to seventh embodiments, and thereby the description of the same structures or functions will be omitted for the sake of simplicity.

Like in the seventh embodiment, the body 2 and the cover 3 of the present embodiment do not have the gasket groove.

Like in the seventh embodiment, receiving surfaces (not shown), against which the compression surfaces of the gasket 4 respectively resiliently contact, are formed in the first opposing surface 26 of the body 2.

Furthermore, a plurality of walls 92, each of which is shaped into an arcuate form and defines the height of the gasket 4 in the compressing direction, is formed at each of the body 2 and the cover 3. The walls at the body side are not depicted for the sake of simplicity.

Like in the seventh embodiment, the cover 3 includes the center-segment receiving surfaces 64, each of which is in the form of protrusion, and the contact surfaces of the gasket 4, which are formed along the perimeter of the gasket 4, resiliently contact against the center-segment receiving surfaces 64, respectively. Thereby, the preset compression ratio of the gasket 4 is set to be larger at the center segments 43 than at the fixation segments 42.

As discussed above, the valve device 1 of the present embodiment achieves advantages, which are similar to those of the first to seventh embodiments.

(Modifications)

In the above embodiments, the valve device of the present disclosure is applied as the valve device (known as the EGR valve device) 1 that controls the flow quantity of the EGR gas. Alternatively, the valve device of the present disclosure may be applied as a valve device (known as a throttle valve device) that controls a flow quantity of the intake air fed to the internal combustion engine. Furthermore, the valve device of the present disclosure may be applied as a valve device (known as a coolant control valve device) that controls a flow quantity of coolant (opening and closing of a flow path and adjustment of an opening degree of the flow path) of the internal combustion engine or controls distribution of the coolant (switching of the flow path) of the internal combustion engine.

In the present embodiment, the elastomer, which is made of mainly by the synthetic rubber (e.g., the EPDM), is used as the material of the gasket. Alternatively, an elastomer, which is made of mainly by natural rubber or thermoplastic elastomer, may be used as the material of the gasket.

In the above embodiments, the cover 3 is fixed to the body 2 by the screws 5 at the fixing points 41. Alternatively, the cover 3 may be fixed to the body 2 by clamps at the fixing points 41. Further alternatively, the cover 3 may be fixed to the body 2 by swaging or snap fitting at the fixing points 41. Further alternatively, the cover 3 may be fixed to the body 2 by spot welding or spot fusing at the fixing points 41.

In the case where the material of the body 2 is easily resiliently deformable material (e.g., the synthetic resin), the center segments 43 of the gasket 4 may be formed as portions that respectively resiliently contact the center-segment receiving surfaces 76, at each of which the resilient repulsive force of the gasket 4 or the heat-induced resilient deformation of the body 2 is larger than the fixation-segment receiving surfaces 75.

Furthermore, in place of each of the slopes 55 of the first embodiment, a bottom surface, which is in a form of smoothly curved surface, may be used to connect between the corresponding fixation-segment-side bottom surface 53 and the corresponding center-segment-side bottom surface 54.

Furthermore, in place of each of the slopes 65 of the second embodiment, a bottom surface, which is in a form of smoothly curved surface, may be used to connect between the corresponding fixation-segment receiving surface 63 and the corresponding center-segment receiving surface 64.

Furthermore, in place of each of the slopes 74 of the third embodiment, a bottom surface, which is in a form of smoothly curved surface, may be used to connect between the corresponding fixation-segment-side bottom surface 72 and the corresponding center-segment-side bottom surface 73.

Furthermore, in place of each of the slopes 77 of the fourth embodiment, a bottom surface, which is in a form of smoothly curved surface, may be used to connect between the corresponding fixation-segment receiving surface 75 and the corresponding center-segment receiving surface 76.

In the first to eighth embodiments, any locations of the gasket, which are other than the locations of the fixation segments 42, may be used as the center segments 43, respectively. For example, each of the connection segments 44 may be included in the corresponding one of the center segments 43.

Furthermore, in a case where the other locations, which are other than the locations of the fixation segments 42, have the thickness that is larger than the thickness of the fixation segments 42 in the compressing direction and is uniform, all of the other locations, which are other than the locations of the fixation segments 42, become the center segments 43, respectively.

Furthermore, in a case where each connection segment, which connects between the two adjacent fixation segments 42, is in a non-linear form, a location, at which the gasket 4 intersects a line perpendicular to an intermediate location of a straight line connecting between the two adjacent fixation segments 42, may be defined as the center segment 43.

Furthermore, in the case where each connecting point, which connects between the two adjacent fixation segments 42, is in the non-linear form, an intermediate location from one of the two adjacent fixation segments 42 to the other one of the two adjacent fixation segments 42 in the circumferential direction of the gasket 4, may be defined as the center segment 43.

Furthermore, in a case where the material of the body 2 and the material of the cover 3 are easily deformable, a location, in which a difference in a strain between the body 2 and the cover 3, i.e., a difference in the amount of deformation between the body 2 and the cover 3 is maximized, may be defined as the center segment 43.

In the first to eighth embodiments, the compression ratio of the gasket 4 in the stacking direction is larger at the center segment 43 than at the fixation segments 42 along both of the longitudinal direction (the top-to-bottom direction in FIG. 4) and the transverse direction (the left-to-right direction in FIG. 4) of the gasket 4. Here, the longitudinal direction of the gasket 4 is defined as a direction along which the distance between the corresponding adjacent two of the fixing points 41 is larger than the distance between the corresponding adjacent two of the fixing points 41 in the transverse direction of the gasket 4, and the transverse direction of the gasket 4 is defined as a direction along with the distance between the corresponding adjacent two of the fixing points 41 is smaller than the distance between the corresponding adjacent two of the fixing points 41 in the longitudinal direction. Furthermore, the compression ratio of the gasket 4 in the stacking direction only along the longitudinal direction of the gasket 4 may be set to be larger at the center segment 43 than at the fixation segments 42.

In the first to eighth embodiments, a peripheral groove (recess) may be formed at the first opposing surface 26 of the body 2 to extend in the circumferential direction along the periphery of the gasket groove 52, 61, 67, 71 to surround the gasket groove 52, 61, 67, 71 at a location that is on the outer side of the gasket groove 52, 61, 67, 71, and a projection (ridge), which is fitted into this peripheral groove, may be formed at the second opposing surface 35 of the cover 3 to extend at the location that is on the outer side of the gasket groove 52, 61, 67, 71. Thereby, a maze structure, which enhances the waterproofness against the externally applied water W, is formed.

Furthermore, in the first to eighth embodiments, a peripheral groove (recess) may be formed at the second opposing surface 35 of the cover 3 to extend in the circumferential direction along the periphery of the gasket groove 52, 61, 67, 71 to surround the gasket groove 52, 61, 67, 71 at the location that is on the outer side of the gasket groove 52, 61, 67, 71, and a projection (ridge), which is fitted into this peripheral groove, may be formed at the first opposing surface 26 of the body 2 to extend at the location that is on the outer side of the gasket groove 52, 61, 67, 71. Thereby, a maze structure, which enhances the waterproofness against the externally applied water W, is formed.

The present disclosure should not be limited to the above embodiments, and the above embodiments may be modified in various forms.

The invention claimed is:

1. A valve device comprising:
   a motor that is configured to generate a rotational output, which drives a valve;
   a plurality of gears that are configured to transmit the rotational output of the motor to the valve;
   a body that has a receiving chamber, which receives the plurality of gears, wherein the body receives the valve;
   a cover that is stacked to the body in such a manner that the cover closes an opening of the receiving chamber; and a gasket that is clamped between the body and the cover and seals a gap between the body and the cover, wherein:

a plurality of points, at which the body and the cover are fixed together, is defined as a plurality of fixing points;

the gasket is an elastomer that is compressed at least in a stacking direction, in which the body and the cover are stacked, while the gasket includes:
- a plurality of fixation segments, each of which is placed in an immediate vicinity of a corresponding one of the plurality of fixing points; and
- a center segment that is placed between corresponding two of the plurality of fixation segments; and a compression ratio of the gasket in the stacking direction is larger at the center segment than at the plurality of fixation segments.

2. The valve device according to claim 1, wherein:

a thickness of the gasket, which is measured in the stacking direction, is uniform or not uniform in a circumferential direction of the gasket;

the body or the cover has a groove, which is in a ring form and receives the gasket; and an amount of protrusion of the gasket from the groove is larger at the center segment than at the plurality of fixation segments.

3. The valve device according to claim 1, wherein:

a material of the cover is resin;

the cover has a groove, which is in a ring form and receives the gasket;

the groove has:
- a plurality of fixation-segment-side bottom surfaces, against which the plurality of fixation segments respectively resiliently contact; and
- a center-segment-side bottom surface, against which the center segment resiliently contacts; and a depth of the center-segment-side bottom surface is smaller than a depth of each of the plurality of fixation-segment-side bottom surfaces.

4. The valve device according to claim 1, wherein:

a material of the body is metal;

the body has a groove, which is in a ring form and receives the gasket;

the groove has:
- a plurality of fixation-segment-side bottom surfaces, against which the plurality of fixation segments respectively resiliently contact; and
- a center-segment-side bottom surface, against which the center segment resiliently contacts; and a depth of the center-segment-side bottom surface is smaller than a depth of each of the plurality of fixation-segment-side bottom surfaces.

5. The valve device according to claim 1, wherein:

a material of the cover is resin;

the cover has:
- a plurality of fixation-segment receiving surfaces, against which the plurality of fixation segments respectively resiliently contact; and
- a center-segment receiving surface, against which the center segment resiliently contacts; and the center-segment receiving surface protrudes further toward the body side in the stacking direction than the plurality of fixation-segment receiving surfaces.

6. The valve device according to claim 1, wherein:

a material of the body is metal;

the body has:
- a plurality of fixation-segment receiving surfaces, against which the plurality of fixation segments respectively resiliently contact; and
- a center-segment receiving surface, against which the center segment resiliently contacts; and the center-segment receiving surface protrudes further toward the cover side in the stacking direction than the plurality of fixation-segment receiving surfaces.

7. The valve device according to claim 1, wherein a thickness of the gasket, which is measured in the stacking direction, is larger at the center segment than the plurality of fixation segments.

* * * * *